United States Patent Office 2,697,092
Patented Dec. 14, 1954

2,697,092

3-METHYLENEPHTHALIDE-ACRYLONITRILE INTERPOLYMERS

Harry W. Coover, Jr., Joseph B. Dickey and Newton H. Shearer, Kingsport, Tenn., assignors to Eastman Kodak Company, Rochester, N. Y., a corporation of New Jersey No Drawing. Original application February 24, 1949, Serial No. 78,222, now Patent No. 2,618,627, dated November 18, 1952. Divided and this application August 25, 1952, Serial No. 306,312

4 Claims. (Cl. 260—85.5)

This invention relates to polymers of 3-methylenephthalide and to a process for preparing them.

This application is a division of our application Serial No. 78,222, filed February 24, 1949, now U. S. Patent 2,618,627, dated November 18, 1952.

3-methylenephthalide has the following formula:

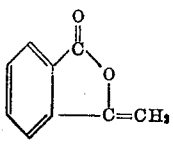

and can be prepared by methods described by Gabriel, "Berichte," vol. 17, page 2521 (1884) or Yale, "Jour. Am. Chem. Soc.," vol. 69, page 1547 (1947). This compound can also be named 3-methylene-1(3H)-isobenzofuranone.

Gabriel noted that a residue, which apparently was the result of slight polymerization, was obtained by his method of preparation. While Gabriel was only able to obtain a polymer of very low molecular weight, we have found that polymers of high molecular weight can be obtained from 3-methylenephthalide, and we have further found that 3-methylenephthalide readily lends itself to interpolymerization with other polymerizable compounds. The polymers obtained according to our invention are characterized by their high melting points, and we have further found that these polymers can readily be dissolved in certain solvents to give solutions which are useful in the preparation of films, fibers, sheets, etc.

It is, accordingly, an object of our invention to provide an improved method for preparing polymers of 3-methylenephthalide of a high molecular weight. It is a further object of our invention to provide interpolymers of 3-methylenephthalide and a method for preparing them. A further object is to provide films, fibers, sheets, etc. prepared from our new, high molecular weight polymers and means for obtaining such materials. Other objects will become apparent from a consideration of the following description and examples.

According to our invention, we prepare polymers of 3-methylenephthalide of high molecular weight by subjecting 3-methylenephthalide or a mixture of 3-methylenephthalide and of from 1 to 3 other polymerizable compounds to the influence of a peroxide polymerization catalyst.

Typical peroxide polymerization catalysts include carboxylic acid peroxides, e. g. acetyl, propionyl, benzoyl, acetyl benzoyl, etc. peroxides, the alkali metal persulfates, e. g. sodium, potassium, etc. persulfates, ammonium persulfate, hydrogen peroxide, t-butyl peroxide, the alkali metal perborates, e. g. sodium perborate, etc., etc. The amount of catalysts employed varies and generally is a function of the compounds being polymerized. Usually from 0.01 to 3.0 percent by weight, based on the total weight of the materials being polymerized, is sufficient, although larger amounts can be used when so desired.

The polymerization can be accelerated by heating the reaction mixture, if desired. For example, temperatures varying from room temperature (about 25° C.) to the reflux temperature of the reactants (usually about 100° C.) can be advantageously employed. Temperatures varying from 35 to 75° C. have been found to be especially useful in utilizing our invention.

The process of our invention can be carried out en masse, or the materials to be polymerized can be dissolved in a suitable solvent and the solution subjected to polymerizing conditions in the presence of at least one of the catalysts set forth above. When volatile or low boiling solvents are employed, the polymerization can be carried out under superatmospheric pressures. Typical solvents or diluents include benzene, toluene, xylenes, 1,4-dioxane, n-hexane, acetonitrile, glycolonitrile, etc. A solvent is advantageously selected which is also a solvent for the interpolymer, although solvents which dissolve the monomers being polymerized, but not the interpolymer formed, can be employed. The polymers can be obtained from the solutions by pouring the solution into a liquid in which the polymers are insoluble, e. g. water, methanol, acetic acid, etc., or the solvent can be evaporated off from the solution.

3-methylenephthalide can also be polymerized according to our invention by a bead or emulsion method in which water or some other medium in which 3-methylenephthalide alone (or mixtures of 3-methylenephthalide and from 1 to 3 other polymerizable compounds) is insoluble, is employed as a dispersing medium, with or without emulsifying agents (e. g. soap, starch, polyvinyl alcohol, gum arabic, etc.). Bead or emulsion methods, as well as solution methods, offer the advantage that a more uniform polymerization can be effected, and these methods largely or entirely avoid any external heating. After polymerization has been effected, the emulsions can be broken by the addition of methanol, acetic acid, etc.

In the preparation of interpolymers from 3-methylphthalide generally any ratio of the 3-methylenephthalide to the total polymerizable compounds present can be used. We have found that polymers of particular utility can be obtained by subjecting a reaction mixture containing from 5 to 95 percent of 3-methylenephthalide by weight, based on the total weight of polymerizable compounds present, to the action of one of the catalysts set forth above. The remaining 5 to 95 percent by weight of polymerizable compounds is advantageously composed of from 1 to 3 polymerizable compounds other than 3-methylenephthalide. Such compounds include polymerizable organic compounds containing a non-aromatic or cyclic >C=C< group. Compounds wherein at least two of the valences of the carbon atoms in the above group are satisfied by hydrogen atoms, e. g. compounds containing a $CH_2=C<$ or a $CH_2=CH-$ group have been found to be especially useful in our invention. Compounds useful in preparing interpolymers according to our invention include, for example, acrylates, α-methacrylates, fumarates, maleates, maleic anhydride, acrylonitrile, α-substituted acrylonitrile, acrylamides, vinyl sulfones, vinyl sulfonamides, alkenyl ketones, vinyl halides, vinylidene halides, polyhalogenoethylenes (e. g. tetrafluoroethylene), hydrocarbons containing olefinic unsaturation, etc.

The acrylates or α-methacrylates we can advantageously use in our invention can be represented by the following general formula:

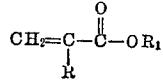

wherein R represents a member selected from the group consisting of a hydrogen atom, a methyl group and an acyloxy group, such as acetoxy, propionoxy, n-butyroxy, isobutyroxy, etc. groups (e. g. an acyl group of an aliphatic carboxylic acid having 2 to 4 carbon atoms), and $R_1$ represents a member selected from the group consisting of a hydrogen atom, an alkyl group, such as methyl, ethyl, n-propyl, isopropyl, n-butyl, isobutyl, secondary and tertiary butyl, etc. groups (e. g. an alkyl group represented by the formula $C_nH_{2n+1}$ wherein $n$ represents a positive integer from 1 to 4), an aralkyl group, such as benzyl, β-phenylethyl, etc. groups, or an alkenyl group, such as vinyl, allyl, β-methallyl, crotyl, isopropenyl, etc. groups (e. g. an alkenyl group represented by the formula $C_nH_{2n-1}$ wherein $n$ represents a positive integer from 2 to 4). Typical are methyl, acrylate, methyl α-methacrylate, ethyl acrylate, ethyl α-methacrylate, n-propyl, acrylate, n-propyl α-methacrylate, isopropyl acrylate, isopropyl α-methacrylate, n-butyl acrylate, n-butyl α-methacrylate, isobutyl acrylate, isobutyl α-methacrylate, benzyl acrylate, benzyl α-methacrylate, vinyl acrylate, vinyl α-methacrylate, allyl acrylate, allyl α-methacrylate, 2-methallyl acrylate, 2-methallyl α-methacrylate, methyl α-acetoxyacrylate, ethyl α-acetoxyacrylate, n-butyl α-butyroxyacrylate, etc.

The olefinic nitriles with which 3-methylenephthalide can be interpolymerized can advantageously be represented by the following general formula:

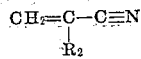

wherein $R_2$ represents a member selected from the group consisting of a hydrogen atom, a methyl group, or an acyloxy group, such as acetoxy, propionoxy, n-butyroxy, isobutyroxy, etc. groups (e. g. an acyl group of an aliphatic carboxylic acid having 2 to 4 carbon atoms). Typical are acrylonitrile, α-methacrylonitrile, α-acetoxyacrylonitrile, α-n-butyroxyacrylonitrile, etc.

The olefinic ketones which we can advantageously use in our invention can be represented by the following general formula:

wherein $R_3$ represents a member selected from the group consisting of an alkyl group, such as methyl, ethyl, n-propyl, isopropyl, n-butyl, isobutyl, etc. groups (e. g. an alkyl group of the formula $C_nH_{2n+1}$ wherein $n$ represents a positive integer from 1 to 4) and an alkenyl group, such as vinyl, β-methallyl, isopropenyl, crotyl, etc. groups (e. g. an alkenyl group of the formula $C_nH_{2n-1}$ wherein $n$ represents a positive integer from 2 to 4), and $R_4$ represents an alkenyl group, such as vinyl, allyl, β-methallyl, isopropenyl, crotyl, etc. groups (e. g. an alkenyl group of the formula $C_nH_{2n-1}$ wherein $n$ represents a positive integer from 2 to 4). Typical are methyl isopropenyl ketone, methyl vinyl ketone, n-butyl vinyl ketone, ethyl isopropenyl ketone, divinyl ketone, diisopropenyl ketone, diallyl ketone, etc.

The olefinic acrylamides which we can advantageously use can be represented by the following general formula:

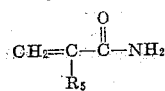

wherein $R_5$ represents a member selected from the group consisting of a hydrogen atom, a methyl group and an acyloxy group, such as acetoxy, propionoxy, n-butyroxy, isobutyroxy, etc. groups (e. g. an acyl group of a carboxylic acid having 2 to 4 carbon atoms). Typical are acrylamide, α-methacrylamide, α-acetoxyacrylamide, etc.

The maleates or fumarates which we can expeditiously use can be represented by the following general formula:

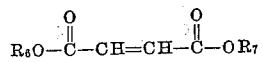

wherein $R_6$ and $R_7$ each represents a member selected from the group consisting of a hydrogen atom, an alkyl group, such as methyl, ethyl, n-propyl, isopropyl, n-butyl, isobutyl, etc. groups (e. g. an alkyl group having the formula $C_nH_{2n+1}$ wherein $n$ is a positive integer from 1 to 4), an aralkyl group, such as benzyl, β-phenylethyl, etc. groups, and an alkenyl group, such as vinyl, allyl, β-methallyl, crotyl, etc. groups (e. g. an alkenyl group of the formula $C_nH_{2n-1}$ wherein $n$ represents a positive integer from 2 to 4). Typical are maleic acid, monomethyl maleate, monomethyl fumarate, dimethyl maleate, dimethyl fumarate, diethyl maleate, diethyl fumarate, di-n-propyl maleate, di-n-fumarate, diisopropyl maleate, di-isopropyl fumarate, di-n-butyl maleate, di-n-butylfumarate, diisobutyl maleate, diisobutyl fumarate, dibenzyl maleate, dibenzyl fumarate, diallyl maleate, etc.

The olefinic carboxylic acid esters which we can advantageously use can be represented by the following general formula:

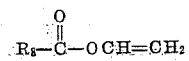

wherein $R_8$ represents a member selected from the group consisting of a hydrogen atom, an alkyl group, such as methyl, ethyl, n-propyl, isopropyl, etc. groups (e. g. an alkyl group of the formula $C_nH_{2n+1}$ wherein $n$ represents a positive integer from 1 to 3), an aryl group, such as phenyl, o-, m- and p-methylphenyl, etc. groups (e. g. a mononuclear aryl group of the benzene series having 6 to 10 carbon atoms), and a substituted aryl group, such as chlorophenyl, carbovinyloxyphenyl, i. e.

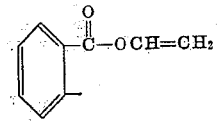

etc. groups. Typical are vinyl formate, vinyl acetate, vinyl propionate, vinyl n-butyrate, vinyl isobutyrate, vinyl benzoate, vinyl chlorobenzoate, divinyl phthalate, etc.

The olefinic hydrocarbons with which we can interpolymerize 3-methylenephthalide can be represented by the following general formula:

wherein $R_9$ represents a member selected from the group consisting of a hydrogen atom, a methyl group, an aryl group, such as phenyl, o-, m- and p-chlorophenyl, dichlorophenyl, p-acetaminophenyl, etc. groups, a vinyl (ethenyl) group ($CH_2=CH-$) and a substituted ethenyl group. Typical are ethylene, propylene, styrene, o-, m- and p-chlorostyrene, p-acetaminostyrene, 1,3-butadiene, 2,3-dimethylbutadiene-1,3, chloroprene, piperylene, etc.

The olefinic or vinylsulfonamides which can advantageously be used in our process can be represented by the following general formula:

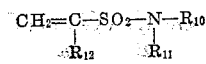

wherein $R_{10}$ and $R_{11}$ each represents a member selected from the group consisting of a hydrogen atom and an alkyl group, such as methyl, ethyl, n-propyl, isopropyl, n-butyl, etc. groups (e. g. an alkyl group of the formula $C_nH_{2n+1}$ wherein $n$ represents a positive integer from 1 to 4), and $R_{12}$ represents a member selected from the group consisting of a hydrogen atom, a methyl group and an ethyl group. Typical are vinylsulfonamide, N-methyl vinyl sulfonamide, N-n-butyl isopropenylsulfonamide, etc.

The vinyl halides which we can advantageously use can be represented by the following general formula:

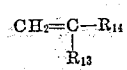

wherein $R_{13}$ represents a halogen atom, such as chlorine, bromine, iodine, or fluorine and $R_{14}$ represents a member selected from the group consisting of a hydrogen atom, a methyl group and a halogen atom, such as chlorine, bromine, iodine, or fluorine. Typical are vinyl chloride, vinyl bromide, vinyl fluoride, isopropenyl chloride, vinylidene chloride, vinylidene bromide, vinylidene fluoride, etc.

Other polymerizable compounds not embraced by the above formulas which can advantageously be utilized in our invention include maleic anhydride, itaconic anhydride, N-vinylphthalimide, N-vinylmaleimide, vinylpyridine, chlorotrifluoroethylene, 1,1-dichloro-2,2-difluoroethylene, tetrafluoroethylene, 2-methoxybutadiene-1,3, etc.

Certain so-called activating agents can be used in conjunction with the peroxide polymerization catalysts, if desired. Such agents include, for example, sodium bisulfite, ferrous sulfate, etc. Chain length regulators, e. g. dodecyl mercaptan, etc. can also be used, if desired.

The following examples will serve to illustrate further the manner whereby we practice our invention.

*Example 1.—Poly-3-methylenephthalide-solution method*

10 g. of 3-methylenephthalide were dissolved in 100 cc. of acetonitrile and 0.01 g. of acetyl peroxide was added. The solution was then heated on a water bath for 28 hours at 40° C. The resulting white polymer was obtained as a swollen mass, which was found to be soluble in a 50/50 mixture of acetonitrile and dimethylformamide. The dried polymer had a melting point of 320° C.

t-Butyl peroxide also was satisfactory for the polymerization, although slightly higher temperatures, e. g. 60°–80° C. had to be used.

*Example 2.—Interpolymer of styrene and 3-methylenephthalide*

9 g. of styrene, 1 g. of 3-methylenephthalide, and 0.02 g. of benzoyl peroxide were placed in a flask, and the air in the flask was replaced with gaseous nitrogen. The flask was then heated on a water bath at 60° C. until its contents had set to a clear, hard mass. The polymer dissolved in chlorobenzene and had a softening point of 150° C. It was found to be readily adaptable for molding purposes.

A molecularly equivalent amount of 2,5-dichlorostyrene can be used in place of the styrene in the above example. The resulting product is obtained in the form of a clear, hard mass.

*Example 3.—Poly-3-methylenephthalide.—Bulk method*

10 g. of 3-methylenephthalied and 0.01 g. of benzoyl peroxide were heated together in a flask for 12 hours at 65°–70° C. The hard mass obtained had a softening point of 300° C. and was soluble in N,N-dimethylacetamide.

*Example 4.—Interpolymer of acrylonitrile and 3-methylenephthalide*

5 g. of acrylonitrile, 5 g. of 3-methylenephthalide, and 0.01 g. of acetyl peroxide were heated together in a glass bottle for 12 hours at 60° C. The white, powdery polymer had a softening point of 180° C. and was soluble in dimethylformamide.

The softening point of interpolymers of acrylonitrile and 3-methylenephthalide can be varied by regulating the ratio of acrylonitrile to 3-methylenephthalide. Generally the higher the percentage of 3-methylenephthalide, the higher the melting point of the interpolymer.

*Example 5.—Poly-3-methylenephthalide.—Emulsion method*

10 g. of 3-methylenephthalide were suspended in 25 cc. of distilled water to which 1 g. of commercial soap flakes were added. 0.06 g. of ammonium persulfate and 0.1 g. of sodium bisulfite were then added and the suspension was warmed on a water bath at 40° C. until polymerization was complete (12–24 hours). The polymer was precipitated from the soapy emulsion by the addition of a small amount of acetic acid. The resulting polymer had a softening point of 310° C. and was soluble in dimethylformamide.

*Example 6.—Interpolymer of styrene and 3-methylenephthalide*

5 g. of styrene and 5 g. of 3-methylenephthalide were placed in a flask which contained 0.02 g. of benzoyl peroxide, and the air in the flask was replaced by gaseous nitrogen. The flask was then heated at 100° C. for 48 hours on a water bath. The clear, hard mass had a softening point of 252° C. and contained 76 percent by weight of 3-methylenephthalide.

The amount of 3-methylenephthalide in the polymer can be controlled by adding the 3-methylenethalide to the reaction mixture during the course of the polymerization at a rate approximating the rate it is used up. This might be desirable where a polymer having a softening point sufficiently low for molding purposes is desired. The presence of large amounts of 3-methylenephthalide in the reaction mixture at any one time tends to produce a polymer of an unusually high melting point.

*Example 7.—Interpolymer of acrylonitrile and 3-methylenephthalide*

8 g. of 3-methylenephthalide and 2 g. of acrylonitrile were suspended 100 cc. of acetic acid to which 0.1 g. of acetyl peroxide had been added. The reaction mixture was then heated on a water bath for 24 hours at 60° C. The white polymer which was thus obtained had a melting point of 295° C. and was soluble in N,N-dimethylacetamide.

Interpolymers of 3-methylenephthalide and acrylonitrile containing about 70 percent by weight of acrylonitrile are useful in the preparation of synthetic fibers. The fibers can readily be prepared by dissolving the interpolymer in dimethylformamide or N,N-dimethylacetamide and forcing the solution under pressure through a spinneret into a coagulating bath. The fibers can be stretched 200–800 percent to increase their strength.

*Example 8.—Interpolymer of acrylonitrile and 3-methylenephthalide.—Emulsion method*

5 g. of acrylonitrile, 5 g. of 3-methylenephthalide, 1 cc. of 10 percent hydrogen peroxide, 1 cc. of 6N-sulfuric acid and 0.2 g. of $FeSO_4.7H_2O$ were added to 30 cc. of distilled water containing 1 g. of commercial soap flakes. The mixture was shaken and the resulting emulsion allowed to stand at room temperature. The polymerization began almost at once and was complete within 3 to 4 hours. Acetic acid was then added to break the emulsion, and the precipitated polymer was filtered off, and washed free of acid and ferric ions with distilled water.

*Example 9.—Interpolymer of 3-methylenephthalide and methyl α-methacrylate*

9 g. of 3-methylenephthalide, 1 g. of methyl α-methacrylate and 0.2 g. of benzoyl peroxide were dissolved in 25 cc. of acetonitrile. The solution was then heated on a water bath at 70° C. for 48 hours. The precipitated white polymer was obtained in almost theoretical yield.

*Example 10.—Interpolymer of 3-methylenephthalide and 2,5-dichlorostyrene*

9 g. of 2,5-dichlorostyrene, 1 g. of 3-methylenephthalide and 0.3 g. of acetyl peroxide were heated at 60° C. for 48 hours. At the end of this time the mixture had set to a hard mass having a high softening point. It was found to be useful for molding purposes.

*Example 11.—Interpolymer of 3-methylenephthalide and vinylidene chloride*

5 g. of 3-methylenephthalide, 5 g. of vinylidene chloride, 2 g. of commercial soap flakes, 0.1 g. of ammonium persulfate and 0.2 g. of ammonium bisulfite were added to 100 cc. of distilled water in a pressure bottle after heating the closed bottle for 20 hours at 40° C., acetic acid was added, and the precipitated polymer was filtered, washed and then dried. The polymer had a softening point above 150° C.

When a molecularly equivalent amount of vinyl chloride replaces the vinylidene chloride in the above example, a clear, hard polymer having a high softening point can be obtained.

By substituting molecularly equivalent amounts of other polymerizable compounds for those illustrated in the examples, other interpolymers exhibiting valuable molding, fiber- and film-forming properties can be obtained. Many of the polymers of our invention, e. g. interpolymers of styrene and 3-methylenephthalide, are useful in the preparation of electrical insulating materials. The properties of the polymers can be varied during or after polymerization by incorporating therein certain plasticizing agents, e. g., di-n-butyl phthalate, camphor, di-n-butyl sebacate, di-β-ethoxyethyl succinate, triacetin, etc. Fillers, coloring matter, etc. can also be incorporated in the polymers. Adhesive materials can be prepared by interrupting the polymerization before the polymer has set to a hard mass and while the polymer is still in a viscous or gummy state.

What we claim as our invention and desire secured by Letters Patent of the United States is:

1. A resinous two-component interpolymer of 3-methylenephthalide and acrylonitrile, said interpolymer containing from 5 to 95 per cent by weight of 3-methylenephthalide and from 95 to 5% by weight of acrylonitrile in the polymer molecule.

2. A resinous two-component interpolymer of 3-methylenephthalide and acrylonitrile, said interpolymer containing 80 per cent by weight of 3-methylenephthalide and 20% by weight of acrylonitrile in the polymer molecule.

3. A resinous two-component interpolymer of 3-methlenephthalide and acrylonitrile, said interpolymer containing 50 per cent by weight of 3-methylenephthalide and 50% by weight of acrylonitrile in the polymer molecule.

4. A process for preparing a resinous two-component interpolymer comprising heating a mixture of 3-methylenephthalide and acrylonitrile in the presence of a peroxide polymerization catalyst, said mixture containing from 5 to 95 per cent by weight of 3-methylenephthalide and from 95 to 5% by weight of acrylonitrile.

References Cited in the file of this patent

UNITED STATES PATENTS

| Number | Name | Date |
|---|---|---|
| 2,449,528 | Flowers | Sept. 14, 1948 |
| 2,475,150 | Mowry | July 5, 1949 |
| 2,489,972 | Mowry et al. | Nov. 29, 1949 |